United States Patent Office 2,974,011
Patented Mar. 7, 1961

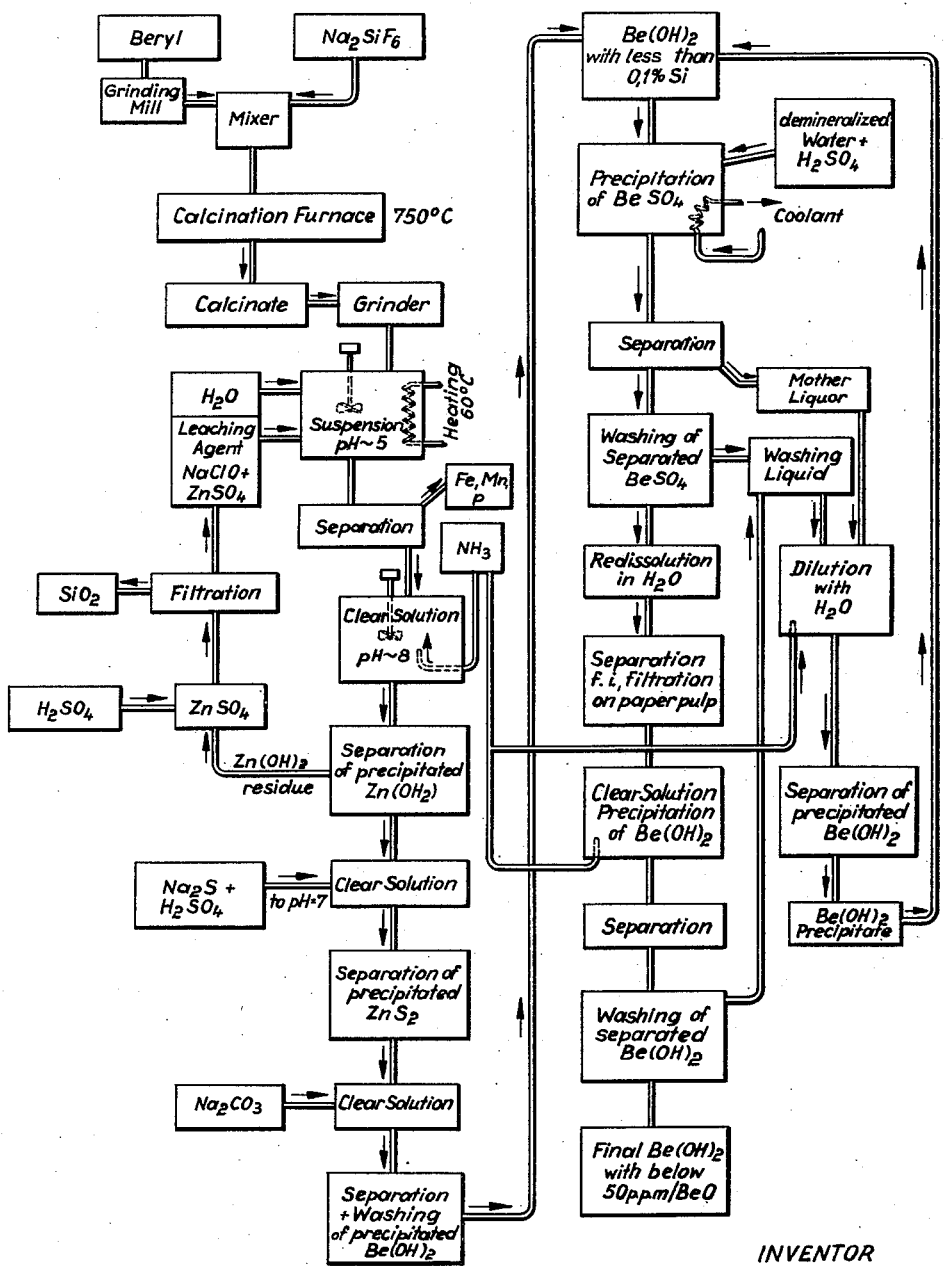

2,974,011
PROCESS OF PURIFYING BERYLLIUM COMPOUNDS

Prokop Riabovol, Salindres, France, assignor to Pechiney, Compagnie de Produits Chimiques et Electrométallurgiques, Paris, France Filed Jan. 27, 1959, Ser. No. 789,451

14 Claims. (Cl. 23—183)

This invention relates to a new process for the purification of beryllium compounds, and more particularly for obtaining very pure beryllium hydroxide and beryllium oxide.

It is generally difficult to obtain beryllium compounds, such as for example the oxide BeO, in a very pure state on an industrial scale. One of the main impurities always contained in industrially produced beryllium oxide and/or beryllium hydroxide is silica which stems from the ores from which beryllium is extracted.

The conventional extraction process consists in attacking beryl mineral with hot sodium fluosilicate solution; the product of this treatment is leached with water, whereby solutions of beryllium and sodium double fluoride can be obtained which contain an important proportion of foreign matter; a part of the latter may be eliminated by partial neutralization of the solutions; however, the beryllium hydroxide, which can then be precipitated from these solutions, is still very impure. Its solvent of silica, expressed as Si, is generally of the order of 1% by weight with respect to the BeO obtained. The product contains variable proportions of the order of 0.05 to 0.1% of each of the common impurities of compounds of Mn, Fe, and/or F. Such an impure BeO is very difficult to transform into a high-purity product in an industrial chemical process.

However, more recently, increasing amounts of beryllium or compounds of this metal in a state of very high purity are required due to new uses thereof, particularly in the nuclear field.

The degree of purity of these beryllium materials for use in nuclear processes is much greater than that of the beryllium metal required in the past for other purposes. In trying to produce such high-purity beryllium materials, great difficulties are encountered in the art for the following reasons.

It is known how to obtain, as an intermediary product in the production of such beryllium materials for nuclear purposes, beryllium oxide and similar compounds having a purity of about 97% and even higher. The production of such relatively pure beryllium oxide is, for instance, described in Patent No. 2,148,250.

However, while it is possible to further purify this beryllium oxide of intermediary degree of purity by removing certain of the impurities still contained in the intermediary-purity BeO therefrom by processes now conventional in the art of preparing high-purity substances, the beryllium oxide produced by the known processes including the aforesaid patent contains certain impurities among which there is, in particular, silicon usually in the above-mentioned proportions, which are extremely difficult to remove from the intermediary product. However, beryllium materials destined for use in the nuclear field should show especially a high degree of purity from silicon; in fact the content of Si in the final BeO should be lower than 0.1% and preferably only 0.005% (or 50 p.p.m.).

It is, therefore, an object of my invention to provide a new process for producing high-purity beryllium compounds of extremely low silicon content suitable for nuclear purposes.

It is another object of my invention to provide a process for producing, as an intermediary product, beryllium compounds, and in particular beryllium hydroxide and beryllium oxide, which are of the conventional purity in the order of 97% and higher, but have a very low silicon content, of less than 0.1% by weight in respect to BeO.

It is finally an object of the invention to produce high-purity beryllium compounds of a silicon content of 50 p.p.m. or less, calculated on the basis of BeO, which beryllium compounds are particularly useful for nuclear purposes.

These objects are attained by the process according to the invention which comprises the steps of purifying aqueous solutions of beryllium salts by treating the solutions with zinc hydroxide in the presence of a compound of fluorine, the pH of the medium being held lower than that corresponding to the precipitation of beryllium hydroxide.

In fact, a very noticeable decrease in the content of various impurities, and in particular of silica, is effected when the solution of a beryllium salt obtained by the conventional chemical attack of the ores, is treated with a zinc hydroxide which is preferably being formed within the solution itself, for instance by adding zinc sulfate to the same; the zinc hydroxide formed or applied in the beryllium salt-containing solution is then separated from the solution, for instance by filtration.

According to one feature of the invention, the solution of beryllium salts contains per gram atom of Be at least 2 gram atoms of fluorine, for example in the form of an alkali fluoride or other soluble fluoride. Particularly good results are obtained with a larger ratio of fluorine atoms, particularly with a ratio of F:Be which is greater than 3:1.

Depending on the concentration of the beryllium salt solution, its content in fluorides, and other operating conditions, I have found that the pH of the solution may vary between certain limits during the treatment with zinc hydroxide: it is generally comprised between 7 and 10, and preferably between 7.5 and 8.5. The best results are obtained with pH values very close to 8.

The elimination of impurities with the aid of zinc hydroxide is the greater, the larger the amount of this compound in a given amount of solution; however, as the degree of purification is not proportional to the amounts of $Zn(OH)_2$ used, it is possible to practically limit the quantity of the reagents without harm to the purity of the resulting $Be(OH)_2$. Thus, according to another feature of the invention, the proportion of employed zinc hydroxide preferably corresponds to a content of zinc comprised between 1 and 10 grams per liter of the solution to be treated. Very good results are obtained with 2 to 4 grams per liter, and more particularly 3 grams; the latter proportion is also very convenient from the economical standpoint.

According to a particular feature of the invention, the zinc component is recycled from one operation to a subsequent one, hence its true consumption is kept very low.

The step of recycling the zinc component in the process according to the invention permits simultaneously recovering the small fraction of beryllium which is retained by zinc hydroxide.

One of the modes of performing the new process, more especially when treating solutions obtained by attacking beryl mineral with sodium fluosilicate, consists in adding to the aforesaid solutions the zinc hydroxide originating from a preceding operation and preferably converted to a water-soluble zinc salt; the pH of the solution is then adjusted to about 5 by the addition of an acid; under these conditions the hydroxides of zinc and beryllium are redissolved. In spite of the recycling step, the content in silica of the solution does not increase because this content corresponds to saturation under the conditions in which the leaching step is effected. However, as the gel of silica and sodium fluosilicate, formed during this operation, disturbs the sedimentation and decantation of the insoluble residues, it is preferable to dissolve the zinc hydroxide separately in an acid, to filter the solution in order to discard silica, and to introduce the solution into the leaching agent. Ferric hydroxide, manganese dioxide and phosphate, present in the zinc hydroxide, do not dissolve at pH 5; now they are separated with the insoluble residues.

Preferably the zinc hydroxide used according to the invention for treating the solutions of Be salts is prepared within the solutions themselves; for this purpose a soluble zinc salt, such as for example zinc sulfate or zinc chloride, is added to the solution. The precipitation of hydroxide is produced by the addition of an alkaline agent such as ammonia or sodium or potassium hydroxide.

As to the small amounts of zinc ions which generally remain in the solution after the treatment with zinc hydroxide, they may, according to another feature of the invention, be eliminated by subsequent precipitation in the form of zinc sulfide; it suffices to treat the solution with a sulfide of ammonium, sodium or the like or with hydrogen sulfide; thus the zinc ion content of the solution can be lowered from 200 mg. per liter down to 5 mg. per liter, and to less than 0.05% by weight with respect to the content of BeO of the beryllium hydroxide then precipitated.

The following figures illustrate the improvement in the purity of beryllium oxide and in particular the selective reduction of the Si content of the latter, obtained by the process according to the invention; the contents are expressed in percent with respect to BeO.

|  | Conventional Process | Process according to the invention |
|---|---|---|
| Si | 1 | 0.05 |
| Mn | 0.01 | 0.002 |
| F | 0.1 | 0.02 |
| Zn | 0.00 | 0.05 |

By subjecting the pre-purified product obtained by the above described steps of process of the invention to a subsequent purification, final contents of Si below 50 parts per million are attained. The beryllium hydroxide may, for example, be treated as follows. By dissolving it in sulfuric acid together with an adequate amount of water, a solution is formed which contains about 44% by weight of $BeSO_4$. The heat of dissolution released is sufficient for raising the temperature of the liquid up to 110° C., at which temperature the solubility is higher than 44%. After cooling the solution down to about 20° the crystallized sulfate $BeSO_4.4H_2O$ is precipitated. The crystals are separated from their mother liquor and are rinsed with water; they contain about 75% of the treated beryllium. Certain impurities remain almost entirely in solution, such as, for instance, Fe, Na, F and others; still others are partially insolubilized: Si in the form of silica, Mn in the form of tetravalent oxide, Ca as calcium sulfate. The crystals of beryllium sulfate are redissolved in demineralized water or distilled water, and their solution is separated from the remainder of insoluble impurities. Now the precipitation of beryllium hydroxide is performed by the addition of ammonia to the separated solution. The traces of $Ca^{++}$, $Mn^{++}$ and $Na^+$, which are still present, remain in solution, and are removed by the subsequent separation from the precipitated beryllium hydroxide.

Thus very pure beryllium hydroxide is obtained which contains only traces of various impurities below the following limit amounts:

Parts per million calculated with respect to BeO

| | |
|---|---|
| Si | 50 |
| Fe | 100 |
| Mn | 1 |
| Al | 100 |
| Zn | 50 |
| Ca | 50 |
| Mg | 5 |
| Na | 50 |
| Li | 0.5 |
| B | 0.3 |
| Cd | 0.5 |

In order to better illustrate the invention there are given the following examples, the steps of which may be easily followed on the accompanying flow sheet.

The invention will be still further illustrated by a number of examples which are, however, not to be considered as limitative of the scope of the invention.

*Example I*

One ton of beryl mineral containing 11% of BeO is ground to a conventional fineness and mixed with one ton of sodium fluosilicate; the mixture is calcinated at 750° C.; the calcinate is ground again and then brought in 20 cubic meters of water, in a vessel provided with a stirrer, so as to be leached therein; the suspension is heated to about 60° C. under stirring; the pH of the medium is maintained in the vicinity of 5 and as leaching agent, zinc sulfate preferably in solution is added in such amounts that the concentration of Zn in the suspension is 3 grams per liter. There are further added 20 liters of a strong sodium hypochlorite solution (50 volumes active $Cl_2$ per volume of water). The suspension is then filtered; the separated clear liquid is introduced into a vat through which ammonia gas is passed, under continuous stirring, until the pH of the solution reaches the value 8. Under these conditions, zinc hydroxide precipitates which retains a very large part of the impurities present such as silica, hydroxides of Fe, Mn and the like. This zinc hydroxide is then separated by filtration; the resulting clear solution is poured into a vessel into which 20 kg. of commercial sodium sulfide having a concentration of 60% by weight is introduced, as well as an amount of sulfuric acid sufficient to adjust the pH of the sodium to about 7. The precipitated zinc sulfide is separated, and the separated clear liquid is treated with sodium hydroxide, under stirring, in order to precipitate beryllium hydroxide under conventional conditions. The precipitate formed is filtered off and washed with water; it contains 103 kg. of BeO and the following impurities calculated in percent with respect to the BeO content:

| | |
|---|---|
| Si | 0.08 |
| Fe | 0.08 |
| Mn | 0.01 |
| Al | 0.01 |
| Ca | 0.25 |
| Mg | 0.5 |
| Zn | 0.05 |
| Na | 0.25 |
| F | 5 |

The intermediary, purified beryllium hydroxide may then be treated further as described in Example III given below.

*Example II*

The operation described in Example I is repeated but the zinc hydroxide originating from a preceding operation is dissolved in a weak solution of sulfuric acid; thus one cubic meter of a zinc sulfate solution is formed which has a pH of about 3. The solution is filtered and added to 20 cubic meters of water destined for use in the leaching step described in the preceding example. The zinc salt used in the first operation can thus be recycled into a subsequent one. However, in order to ensure that the full concentration of 3 grams of Zn per liter is maintained, the loss of 10% of Zn, which occurs during the operation, is compensated by the addition of fresh zinc sulfate, about 6 kg. of Zn being required for this purpose in the case of the amounts given above. The same procedure is effected with each further leaching.

*Example III*

Wet beryllium hydroxide having a BeO content of 44% by weight, and obtained by the operation described in Examples I and II, is dissolved in sulfuric acid in order to subject the beryllium hydroxide to a more thorough purification. For this purpose, a total amount of hydroxide corresponding to 136 kg. of BeO is introduced into an enameled vessel containing 570 liters of demineralized water and 550 kg. of a 98% concentrated sulfuric acid. The heat evolved during the ensuing reaction raises the temperature of the solution to 110° C. and causes the evaporation of 100 liters of water. At this temperature the formed beryllium sulfate is completely dissolved. Cold water is then passed through the double shell or other adequate cooling means of the apparatus for cooling the solution, and beryllium sulfate crystals are being formed. As the temperature of the resulting crystal slurry drops to 20° C., the slurry is filtered and the $BeSO_4$ crystals are separated from the mother liquor. The crystals are rinsed on the filter with 70 liters of cold water, and the washing liquid is combined with the mother liquor. The crystals of beryllium sulfate $BeSO_4.4H_2O$ are redissolved in 2000 liters of warm water; the obtained solution is filtered on paper pulp, the filtrate is then introduced into an ebonite coated vat wherein beryllium hydroxide is precipitated by bubbling ammonia through the liquid. After filtration and washing with water, the final precipitate contains 102 kg. of BeO, while its content in impurities does not exceed the following amounts expressed as parts per million based on the amounts of BeO in the beryllium hydroxide:

| | |
|---|---|
| Si | 50 |
| Fe | 75 |
| Mn | 1 |
| Al | 100 |
| Ca | 50 |
| Mg | 5 |
| Na | 50 |
| Li | 0.5 |
| Zn | 20 |
| Cd | 0.5 |
| B | 0.3 |

*Example IV*

In the course of a production described in Example III, the combined mother liquors and the washing liquid amounting to a total volume of about, for instance, 450 liters, are diluted with 700 liters of water in a vessel provided with a stirrer, and the pH of the resulting solution is adjusted to 5 by means of introducing ammonia without applying heat; about 2 kg. of ammonia are required. A mud is then formed, which is separated by filtration; from the filtered-off clear liquid, beryllium hydroxide is precipitated by the introduction of a larger amount of about 23 kg. of ammonia, under room temperature. After filtration, the precipitate, which contains 33 kg. of BeO, is admixed to a freshly prepared beryllium hydroxide resulting from the operation described, for instance, in Example I or II, and intended to be dissolved in sulfuric acid as described in Example III for further precipitation. It is operated in the same manner in each of the subsequent dissolutions and crystallisations.

By the process of the present invention it is possible to produce high-purity beryllium compounds particularly free from silicon on an industrial scale and in an economical manner. This process permits of considerably lowering the content in impurities in solutions of beryllium salts; beryllium oxide or hydroxide, directly obtained as described in the above examples, can then be transformed into beryllium containing products of very high purity suitable for use in nuclear work. All water-soluble beryllium compounds, e.g. beryllium sulfate, beryllium nitrate, beryllium-ortho phosphate, beryllium chloride, beryllium bromide, fluoride, iodide and beryllium benzene sulfonate can be purified by the process according to this invention. Beryllium sulfate is particularly suitable due to the well-known difference of its solubility in cold and hot water, and due to its commercial availability.

Instead of sodium-fluosilicate, other water-soluble fluorine-containing compounds could be used, among which are ammonium fluoride, sodium fluoride, potassium fluoride, hydrofluoric acid and even beryllium fluoride itself.

It will be easy for a skilled chemist to calculate the stoichiometrically required amounts of these compounds on the basis of the examples given hereinbefore.

It will be understood that this invention is susceptible to further modification and, accordingly, it is desired to comprehend such modifications within this invention as may fall within the scope of the appended claims.

The embodiments of the invention in which an exclusive property or privilege is claimed are defined as follows:

1. A process for the purification of beryllium compounds comprising the steps of treating an aqueous solution of a water soluble inorganic beryllium salt having at least one impurity selected from the group consisting of silicon, manganese and phosphorous; with a precipitate of zinc hydroxide in the presence of fluoride ions while maintaining the pH of the solution lower than that corresponding to the precipitation of beryllium hydroxide, separating the precipitated zinc hydroxide from the solution, then adding an alkaline agent to raise the pH of the solution separated from the zinc hydroxide precipitate, until the beryllium hydroxide precipitates, and separating the beryllium hydroxide precipitate from its mother liquor.

2. A process for the purification of beryllium compounds comprising the steps of
   (1) adding to an aqueous solution of a water-soluble inorganic beryllium salt having at least one impurity selected from the group consisting of silicon, manganese and phosphorous; a water-soluble fluorine-compound capable of forming ions in an aqueous solution, and a water-soluble zinc salt,
   (2) adding an alkaline agent selected from the group consisting of ammonia, sodium hydroxide and potassium hydroxide to the solution to adjust the pH of the latter to between about 7.5 and 8.5,
   (3) separating the resulting precipitate of zinc hydroxide from the solution,
   (4) adding an alkaline agent selected from the aforesaid group to the clear solution to raise the pH of the latter above about 10 so as to precipitate beryllium hydroxide, and
   (5) separating the beryllium hydroxide from its another liquor.

3. A process for the purification of beryllium compounds comprising the steps of
   (1) adding to an aqueous solution of a water-soluble inorganic beryllium salt having at least one impurity selected from the group consisting of silicon, manganese and phosphorus; a water-soluble fluorine compound capable of forming fluoride ions in an aqueous solution, in such an amount that the atom ratio of F:Be in the resulting mixture is at least 2:1, and a water-soluble zinc salt,
   (2) adding an alkaline agent selected from the group consisting of ammonia, sodium hydroxide and potassium hydroxide to the solution to adjust the pH of the latter to between about 7.5 and 8.5, (3) separating the resulting precipitate of zinc hydroxide from the solution, (4) adding an alkaline agent selected from the aforesaid group to the clear solution to raise the pH of the latter above about 10 so as to precipitate beryllium hydroxide, and (5) separating the beryllium hydroxide from its mother liquor.

4. A process for the purification of beryllium compounds comprising the steps of (1) adding to an aqueous solution of a water-soluble inorganic beryllium salt having at least one impurity selected from the group consisting of silicon, manganese and phosphorous; a water-soluble fluorine compound capable of forming fluoride ions in an aqueous solution, and a water-soluble zinc salt, until the zinc content of the resulting mixture is between 1 and 10 grams of Zn per liter of solution, (2) adding an alkaline agent selected from the group consisting of ammonia, sodium hydroxide and potassium hydroxide to the solution to adjust the pH of the latter to between about 7.5 and 8.5, (3) separating the resulting precipitate of zinc hydroxide from the solution, (4) adding an alkaline agent selected from the aforesaid group to the clear solution to raise the pH of the latter above about 10 so as to precipitate beryllium hydroxide, and (5) separating the beryllium hydroxide from its mother liquor.

5. A process for the purification of beryllium compounds comprising the steps of (1) adding to an aqueous solution of a water-soluble inorganic beryllium salt having at least one impurity selected from the group consisting of silicon, manganese and phosphorous; a water-soluble fluorine-compound capable of forming fluoride ions in an aqueous solution, and a water-soluble zinc salt, (2) adding an alkaline agent selected from the group consisting of ammonia, sodium hydroxide and potassium hydroxide to the solution to adjust the pH of the latter to between about 7.5 and 8.5, (3) separating the resulting precipitate of zinc hydroxide from the solution, (4) adding an alkaline agent selected from the aforesaid group to the clear solution to raise the pH of the latter above about 10 so as to precipitate beryllium hydroxide, and (5) separating the beryllium hydroxide from its mother liquor, and (6) treating the separated zinc hydroxide with an acid having the same anion as the zinc salt in step (1), to regenerate the originally introduced water-soluble zinc salt and reintroducing the latter into step (1).

6. A process for the purification of beryllium compounds comprising the steps of (1) adding to an aqueous solution of a water-soluble inorganic beryllium salt having at least one impurity selected from the group consisting of silicon, manganese and phosphorous; a water-soluble fluorine-compound capable of forming fluoride ions in an aqueous solution, in such amounts that the atom ratio of F:Be is greater than 3:1, adding a water-soluble zinc salt in such amounts that the zinc content of the resulting mixture is about 2 to 4 grams per liter of solution, (2) adding an alkaline agent selected from the group consisting of ammonia, sodium hydroxide and potassium hydroxide to the solution to adjust the pH of the latter to between about 7.5 and 8.5, (3) separating the resulting precipitate of zinc hydroxide from the solution, (4) adding an alkaline agent selected from the aforesaid group to the clear solution to raise the pH of the latter above about 10 so as to precipitate beryllium hydroxide, and (5) separating the beryllium hydroxide from its mother liquor.

7. A process for the purification of beryllium compounds comprising the steps of (1) adding to an aqueous solution of a water-soluble inorganic beryllium salt having at least one impurity selected from the group consisting of silicon, manganese and phosphorous; a water-soluble fluorine-compound capable of forming fluoride ions in an aqueous solution, and a water-soluble zinc salt, (2) adding an alkaline agent selected from the group consisting of ammonia, sodium hydroxide and potassium hydroxide to the solution to adjust the pH of the latter to between about 7.5 and 8.5, (3) separating the resulting precipitate of zinc hydroxide from the solution, (4) adding a sulfide ion-forming compound selected from the group consisting of hydrogen sulfide, the sodium sulfides, the potassium sulfides and the ammonium sulfides, to the solution resulting from the preceding step so as to precipitate zinc ions retained in the latter as zinc sulfide, (5) separating the zinc sulfide precipitate from the mixture, (6) adding an alkaline agent selected from the aforesaid group to the clear solution to raise the pH of the latter above about 10 so as to precipitate beryllium hydroxide, and (7) separating the beryllium hydroxide from its mother liquor.

8. In the process of purifying an inorganic beryllium salt solution having at least one impurity selected from the group consisting of silicon, manganese and phosphorous; to obtain a beryllium compound having an extremely low silica content, the steps of adding to the solution a water-soluble, fluorine-ions forming substance and a water-soluble zinc salt, adjusting the pH of the resulting mixture to above 7 and below 10, and separating the resultant precipitate occluding the impurities and principally the silica, from the solution which retains as impurity, calculated on the basis of the BeO content of the solution, only less than 0.1 per cent by weight of silica 9. The process in claim 1, wherein the starting solution containing the beryllium salt is obtained by the preliminary steps of (a) mixing ground beryl mineral with sodium fluosilicate, calcining the mixture in a conventional manner, and leaching the resulting calcinate with a leaching agent consisting of water, a water-soluble zinc salt, and sodium hypochlorite, while heating the resulting suspension to about 60° C. and maintaining the pH of the same at about 5, and (b) separating the clear beryllium ions-and zinc ions-containing solution from the residue.

10. The process described in claim 1, further comprising the steps of redissolving the separated beryllium hydroxide precipitate in sulfuric acid and recrystallizing the resulting beryllium sulfate from hot water solution by cooling the latter, thereby obtaining a crystalline beryllium sulfate containing per each million parts of BeO contained therein, less than 50 parts of silicon.

11. A process for the purification of aqueous solutions containing beryllium ions and at least one impurity selected from the group consisting of silicon, manganese and phosphorous, comprising the steps of: contacting said impure aqueous solutions with a precipitate of zinc hydroxide in the presence of fluoride ions, while maintaining the pH at a value so that beryllium hydroxide is not precipitated; separating the precipitate of zinc hydroxide containing substantial amounts of said impurities from the remaining aqueous solution of beryllium ions.

12. A process for the purification of aqueous solutions of beryllium salts comprising the steps of:

(1) adding fluoride ions and zinc ions to an aqeous solution containing inorganic beryllium salts having at least one impurity selected from the group consisting of silicon, manganese and phosphorous, (2) raising the pH of said zinc, beryllium and fluoride containing solutions to between 7 and 10 to form a precipitate of zinc hydroxide which occludes impurities from the solution, (3) separating said precipitate from the solution thereby leaving a purified solution of beryllium salt.

13. The process described in claim 12 wherein in step (2), the pH range is betwen 7.5 and 8.5.

14. The process described in claim 12 wherein in step (2), the pH range is about 8.

References Cited in the file of this patent

UNITED STATES PATENTS

| | | |
|---|---|---|
| 1,966,371 | Zisch et al. | July 10, 1934 |
| 2,312,297 | Kawecki | Feb. 23, 1943 |
| 2,399,178 | Furland | Apr. 30, 1946 |